Dec. 19, 1961 G. WIGGERMANN 3,013,519
SHIP PROPULSION AND STEERING SYSTEMS
Filed Feb. 13, 1956 5 Sheets-Sheet 1

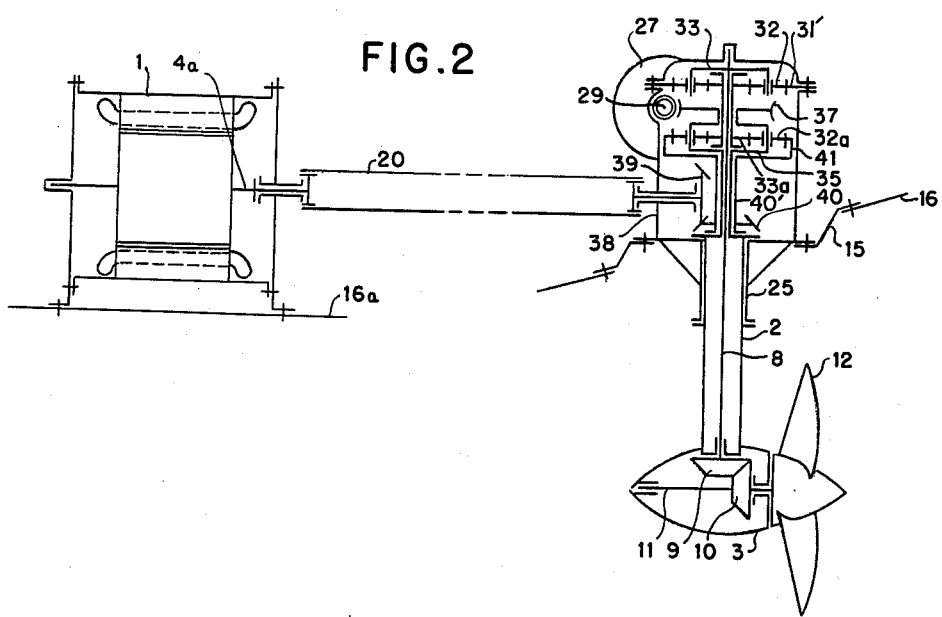
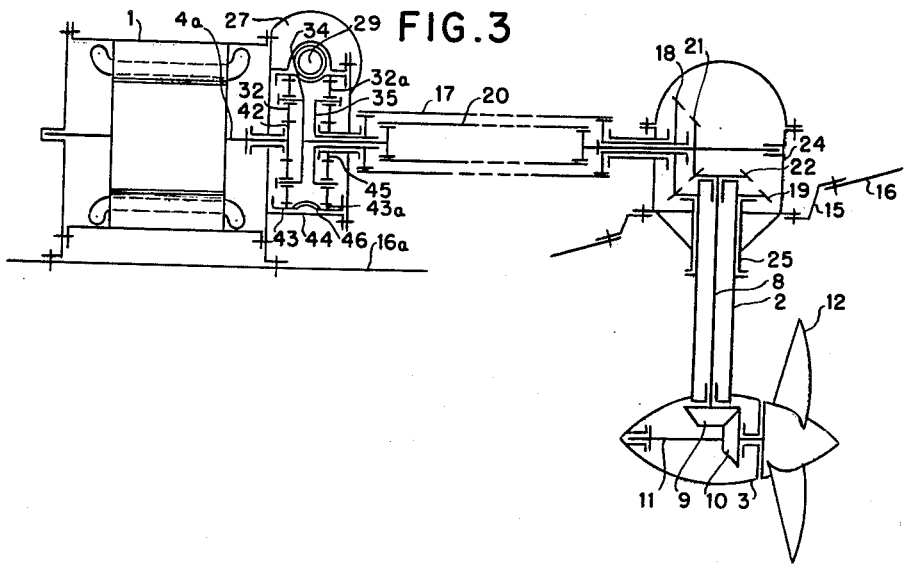

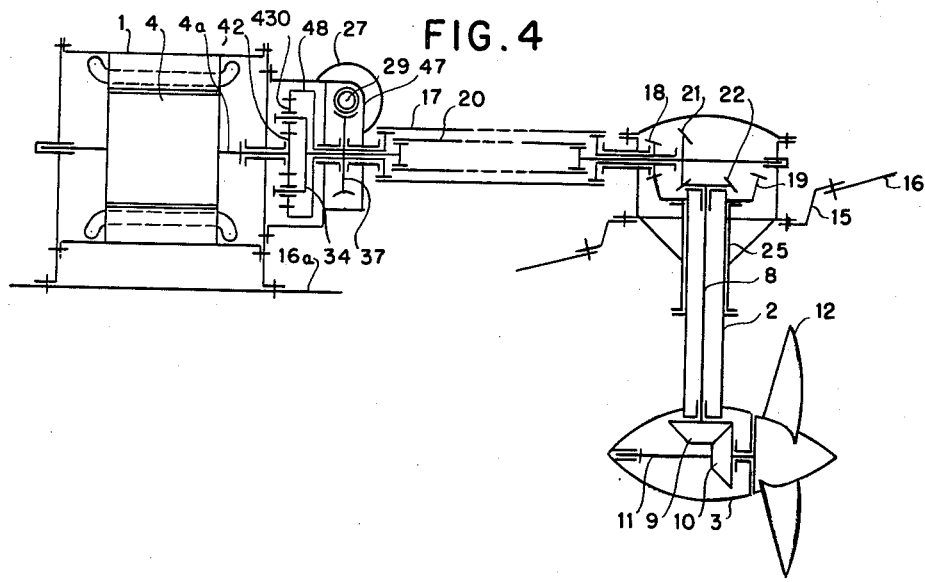
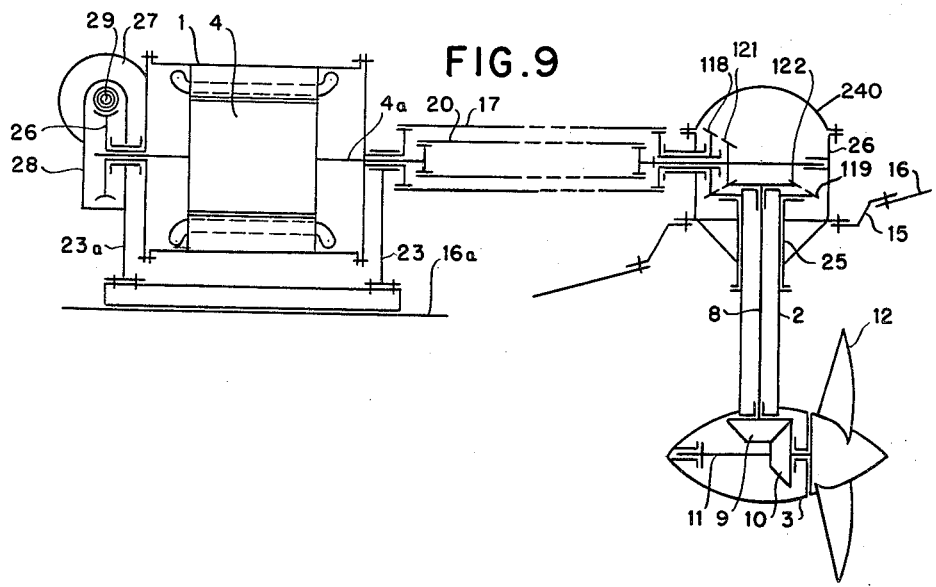

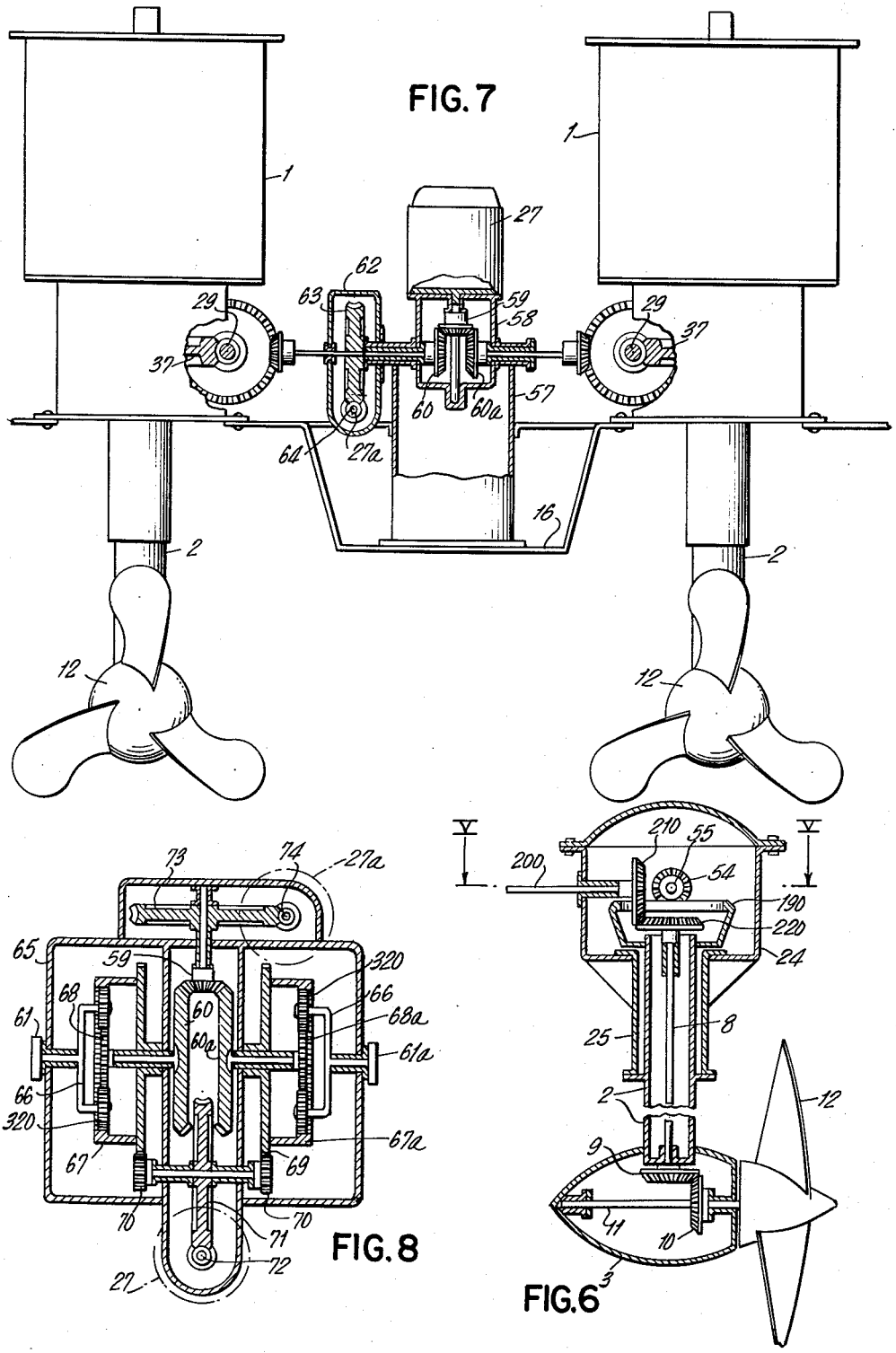

United States Patent Office 3,013,519
Patented Dec. 19, 1961

3,013,519
SHIP PROPULSION AND STEERING SYSTEMS
Georg Wiggermann, Spitzgartenweg 10, Kressbronn, Germany, assignor of one-half to Walter Reiners, M. Gladbach, Germany
Filed Feb. 13, 1956, Ser. No. 565,216
Claims priority, application Germany Feb. 14, 1955
23 Claims. (Cl. 115—35)

My invention relates to ship propulsion and steering systems of the type in which, for steering the vessel, the ship propeller is pivotally displaceable about an axis usually perpendicular to the axis of propeller rotation. In such systems the propulsion drive motor, engine or other prime mover is located at the stern or outside the vessel and is pivotally turned together with the propeller. Driving power is supplied from the prime-mover shaft through a transmission shaft which extends downwardly to an angular or bevel gearing through which it drives the propeller shaft. The angular gearing is mounted in a housing, or gear head, connected to the housing of the prime mover by a hollow shaft or outrigger pipe. By virtue of their simple construction, ease of manipulation and good accessibility, such propulsion plants are often preferred for small boats.

Furthermore, it is known that in propulsion plants with a pivotally displaceable propeller screw, the steering operation is affected by an opposing torque which corresponds to the torque of the vertical drive shaft and represents a unilaterally reactive displacing moment. As is known, this detriment can be eliminated by having the propulsion motor impart a torque upon the above-mentioned gear head, this imparted torque being independent of the pivotal gear-head displacement and corresponding to the driving torque of the vertical drive shaft, but acting in the opposite sense of rotation relative thereto. In such a device, the pivotal movement of the gear head and ship propeller, and hence the steering of the vessel, can then be performed in a manner completely unaffected by the torque and direction of rotation of the drive motor, and hence without the necessity of applying the appreciable steering force otherwise needed for overcoming the reaction torque when changing the course of the vessel.

However, propulsion machines of large power output, which are pivotally rotatable about their axis, for instance, upon a ball race, can be accommodated only with great difficulty at the stern of the vessel together with the pivoting devices required for steering. Consequently, when large power requirements are involved, special expedients and designs must be resorted to, or the propulsion machine and the pivoting mechanism for steering must be located within the body of the vessel at a location forwardly spaced from the stern.

Further difficulties when applying larger propulsion power in systems of the kind mentioned, regardless of whether the propulsion system is mounted on the stern or within the body of the vessel, are encountered by the fact that a large expenditure in structural components is needed for the desired bracing against the reaction torque, taken for instance off the housing of the propulsion motor. For instance, a special construction for journalling the housing of the prime mover is needed when a piston engine, such as a diesel engine, is used.

It is an object of the invention to permit the advantageous utilization of such pivotally displaceable propeller systems for propulsion drives requiring a larger power supply than heretofore economically applicable with systems of this type.

For achieving these objects and in accordance with one of the features of my invention, I connect the drive shaft of the propulsion prime mover mounted on the vessel with the transmission shaft leading to the propeller through one or more distributor transmission gearings of the differential type, preferably planetary gearings, whose housing is fastened to the body of the vessel and whose third, "free" gear member is connected, on the one hand, with the pivotal-displacement control device and, on the other hand, is connected through further transmission or gear means with the gear head of the propeller screw so as to impart pivotal displacement to the gear head.

As a result, the reactive moment tending to oppose any change in steering displacement is no longer absorbed by the reaction torque of the propulsion prime mover but rather by the hull or body of the vessel itself. This obviates the necessity for using the complicated devices for journalling of machine parts, such as the housing of the prime mover, heretofore needed for bracing the reaction torque, thus affording the advantage that the use and exchange of normal prime movers or motors is readily possible.

By virtue of the above-mentioned combination of intermediate distributor transmission gearings between prime mover and steerable propeller assembly, the invention further affords a diversity of novel and advantageous possibilities of mounting the prime mover and the steerable propulsion assembly proper, and of designing these components to meet special requirements.

For instance, the propulsion prime mover or motor may be combined with the distributor transmission gear means in coaxial relation thereto so as to form a single unit to be mounted on the stern of the vessel.

According to another specific feature of the invention, the propulsion motor and the distributor gear means form a unit mounted in the body of the vessel, and are connected with the propeller shaft and the pivotally movable gear head by respective intermediate transmissions.

According to still another specific feature of the invention, the distributor transmission gear means are coaxially combined to a single unit with the vertical transmission shaft for driving the propeller, this unit being mounted on the stern, whereas the prime mover is mounted in the body of the vessel in spaced relation to the propulsion and steering unit proper.

Also with respect to the design of the distributor gearings themselves, the invention permits of a number of variations and modifications relating particularly to the connection of the individual kinematic gear members to the prime mover, to the propeller shaft, and to the pivotally displaceable gear head for the purpose of dividing and distributing the prime-mover torque onto the propeller and the gear head respectively.

Regardless of the particular modification preferred for any given purpose, a propulsion and steering plant according to the invention involves the following requirements:

(a) If the prime mover or drive motor is secured to the vessel and only the prime-mover shaft is revolvable, then the torque supplied by the drive shaft must be branched-off, by means of a differential mechanism or distributor gearing, such as a planetary gearing or differential bevel-gearing, onto two driving connections or transmissions of which one is drivingly connected with the propeller shaft and the other with the gear head. The transmission ratios of these intermediate driving connections or transmissions are so rated that a pivotal movement of the gear head is possible when the propeller shaft is at rest, without requiring a revolving movement of the drive shaft or prime mover.

(b) The steering device of a ship, controlled directly by the steering wheel or by servomotoric power supplied, for instance, from a rudder motor, must always be connected in a suitable manner and at a suitable place with the transmission branch leading to the gear head, so that this branch of the intermediate connection or transmission can be driven, in accordance with the desired pivotal movement of the gear head, in one or the other direction of rotation and will then effect a corresponding constrained pivotal movement of the gear head.

While the above-mentioned and other essential features of the invention are set forth with particularity in the claims annexed hereto, the foregoing and further objects, advantages and specific features of my invention will be apparent from, and will be set forth in, the following description relating to the embodiments of propulsion and steering plants according to the invention illustrated on the drawings, all embodiments being shown schematically and partly or entirely in section.

FIG. 2 shows a modified embodiment in which the prime mover is mounted separately in the hull of the vessel.

FIG. 3 illustrates an embodiment in which a prime mover as well as the distributor transmission gearings are mounted in the hull separate from the propeller assembly proper.

FIG. 4 shows a propulsion drive in which a prime mover is combined to a unit with only one of the distributor gearings and is mounted in the hull separate from a second distributor transmission gearing combined with the steerable propulsion unit proper.

FIG. 6 is a partial lateral sectional view of the propulsion plant according to FIG. 5 and taken in the direction VI—VI of FIG. 5.

FIGS. 7 and 8 illustrate two different embodiments, respectively, of a control mechanism for a twin-propulsion plant such as the one shown in FIGS. 5 and 6.

FIG. 9 shows an example of an embodiment for the transmission of the propulsion and reaction torques.

The same reference numerals are used in all illustrations for functionally similar components respectively.

Figure 1:
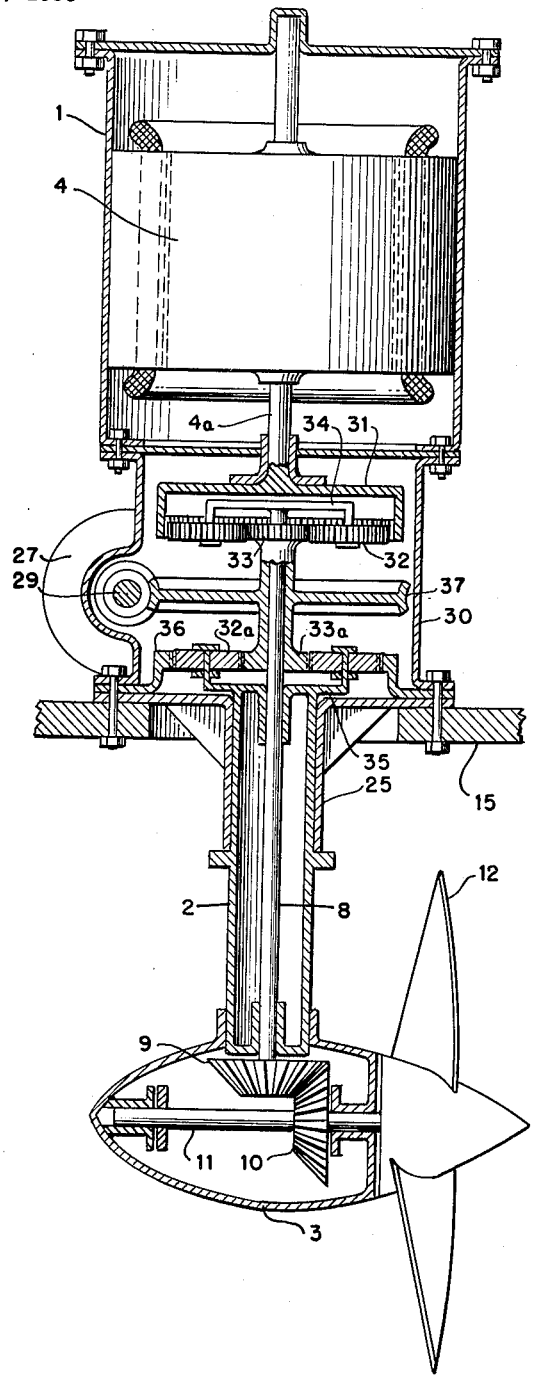
FIG. 1 shows a ship propulsion drive in which the prime mover, the distributor transmission gearings and the propeller gear head are coaxially combined to a single unit mounted in the stern portion of the vessel.

In the coaxial propulsion unit according to FIG. 1 the housing 30 of a distributor gearing is rigidly mounted on a bottom flange 15 and carries the housing 1 of the prime mover, for instance an electric motor 4, the housings 30 and 1 being rigidly joined together. Housing 30 also carries a pivot bearing 25 for the hollow shaft (outrigger pipe) 2 to which the propeller gear head 3 is secured. The shaft 4a of motor 4 is coaxially connected with the orbit gear 31 of a planetary distributor transmission gearing. Orbit gear 31 meshes with satellite or planet gears 32 which are in meshing engagement with a sun gear 33 and are journalled on a rotatable bridge member 34. Member 34 of the distributor transmission gearing is coaxially and non-rotatably connected with a transmission shaft 8. The bridge member 35 of another distributor transmission gearing, located below the one mentioned above, is non-rotatably joined with the hollow shaft 2 and thus also with the propeller gear head 3. The second distributor gearing is also of a planetary type. Its planet gears 32a are in mesh with a sun gear 33a and an outer spur-gear circle mounted on the gear housing 30. The sun gears 33 and 33a are both connected with a worm gear 37 to form a rigid assembly together therewith, and this gear assembly is rotatably mounted on the shaft 8 which is coaxially aligned with drive shaft 4a and coaxially disposed in hollow shaft 2. Worm gear 37 engages a worm 29 which can be driven in either direction of rotation from the steering control of the ship, for instance by means of a rudder drive motor 27. The two planetary distributor gearings have the same transmission ratio. Consequently the torques of shaft 8 are transmitted in equal proportions but in mutually inverse senses of rotation to the respective sun gears 33 and 33a thus being always in balance with each other so that the steering displacement is transmitted by worm 29 to worm gear 37 without causing unbalance torques. Such steering displacement always effects the desired pivotal steering movement of the propeller gear head 3 and hence of the propeller shaft 11 with the propeller screw 12, as will readily be recognized if one considers the orbit gear 31 to be stationary.

In the embodiment according to FIG. 2 the housing 1 of the propulsion motor 4 is mounted on the deck 16a at some distance from the vertical pivot axis of the propulsion unit proper. The housing 38 of the distributor gearing is rigidly mounted on a bottom flange 15 and encloses in its top portion a double distributor gearing. Secured to the bottom of housing 38 is the pivot bearing 25 for the hollow shaft 2 carrying the propeller gear head 3 and the propeller screw 12. When loosening the gear housing 38 from the bottom flange 15, the entire assembly can be removed as a whole towards the interior of the vessel.

The vertical inner shaft 8 is non-rotatably connected with the bridge member 34 which journals planet gears 32 of the upper distributor gearing. The outer hollow shaft 2 is similarly connected with the bridge member 35 which journals the planet gears 32a of the lower distributor gearing. Driving power is supplied from motor 4 through a flexible or Cardanic shaft 20, a bevel gear 39 journaled in gear housing 38, a bevel gear 40 meshing with gear 39 and journalled in coaxial relation to shaft 8. Bevel gear 40 is rigidly joined with shaft 40' which is rigidly joined with the orbit gear 41 of the lower distributor gearing. Orbit gear 41 corresponds to orbit gear 36 of FIG. 1 and transmits driving power through planetary gears 32a to the sun gear 33a which is rigidly connected with the sun gear 33 of the upper gearing. Thence the power is transmitted to the planet gears 32 of the upper distributor gearing which in turn mesh with upper annular spur-gear 31' stationarily joined with the gear housing 38, thus driving the bridge member 34 and the shaft 8 on which the member 34 is mounted. In this embodiment the worm 37 is rigidly joined with the bridge member 35 of the lower distributor gearing and, for effecting pivotal steering displacement, is driven by worm 29 as desired and in the proper direction of rotation by means of a rudder drive motor 27.

The embodiment of FIG. 3 satisfies the same mounting conditions as that of FIG. 2 and, as to details, differs from the embodiment of FIG. 2 essentially only by having the distributor gearing for torque division and the distributor gearing for transmitting the partial torque to the outrigger pipe 2 flange-mounted directly on the housing 1 of the electric motor. The bracing torque and the torque for driving the propeller screw are transmitted by means of two telescopically arranged flexible or Cardanic shafts 17 and 20 through two likewise coaxially journalled bevel gears 18, 21 and thence through respective bevel gears 19, 22 to outrigger pipe 2 and shaft 8 respectively. The twin distribution gearing in the gear housing 44 differs from that of FIG. 1 or FIG. 2 in that driving power from shaft 4a is imparted not to an orbit gear but to the sun gear 42. The bridge member 34 is in mechanical connection with shaft 8, and bridge member 35 is connected with the outrigger pipe 2. The planet gears 32 and 32a are rotatively journalled on the respective two bridge members 34, 35 and mesh with the two rigidly inter-connected annular spur-gears 43 and 43a rotatably mounted in housing 44. The planet gears are further in meshing engagement with respective sun gears 42 and 45. Sun gear 45 is firmly secured to the gear housing 44. A worm gear member 46 is rigidly connected with the two spur-gears 43, 43a and engages a worm 29 which, for steering, can be driven in either directions of rotation by means of the rudder drive motor 27. Both bevel gear pairs 18/19 and 21/22 have the same transmission ratio.

In functional respects the two spur-gears 43, 43a rigidly connected with each other and with the worm gear member 46, correspond to the two sun gears 33, 33a in the embodiment according to FIG. 1. As in the case of FIG. 1, the two planetary gearings in the gear housing 44 of FIG. 3 have the same transmission ratio.

The embodiment according to FIG. 4 shows that the propulsion drive may be provided with a single distributor gearing and that then the two torques, being transmitted to the shaft 8 and to the outrigger pipe 2 respectively, can be made equal in magnitude by means of one of the other transmission gearings which are in any case required between prime mover and propeller screw. In this embodiment the equalization of the two torques is effected, for example, by the bevel gearing required in the top gear housing 24 of the steerable propulsion assembly proper.

According to FIG. 4, a gear housing 47 has a flange firmly secured to the housing 1 of the electric propulsion motor 4. The shaft 4a of the motor drives a sun gear 42 meshing with satellite or planet gears 430 which are rotatably journalled on a bridge member 34 and are also in meshing engagement with an annular orbit gear 48. The bridge member 34 is in driving connection with the shaft 8 through a flexible or Cardanic shaft 20 and a pair of bevel gears 21, 22. The orbit gear 48 is in driving connection with the outrigger pipe 2 through a flexible or Cardanic shaft 17 and a pair of bevel gears 18', 19'. Mounted on the hollow shaft of the orbit gear 48 is a worm gear 37 meshing with a worm 29. The worm 29 can be driven by the rudder motor 27 for providing the displacing movement in one or the other direction required for steering.

In accordance with the mechanics applying to planetary gears, the torque transmitted to the bridge member 34 in the present embodiment is very much larger than, but opposingly directed to, the torque transmitted to the orbit gear 48. Therefore, in contrast to the embodiments previously described, the transmission ratio of the bevel-gear pair 18'/19' differs from that of the bevel gear pair 21/22 to such an extent that the respective torques, imparted from the distributor gearing to the respective flexible shafts 17 and 20, are transferred at the same relative magnitude, to shaft 8 and outrigger pipe 2.

According to my invention, two individual propulsion plants, each incorporating the above-described distributor-gear principle and each having its own propulsion motor, can be combined to form a twin propulsion assembly by interconnecting the two gear heads or hollow pivot shafts 2 with the aid of transmission means in such a manner that the respective reactive bracing moments oppose and cancel each other. In such a twin system, equal driving torques in the two propeller drives can be secured merely by proper choice of the particular properties of the prime mover or by means of additional regulating devices on a prime mover. In cases where such an equality of the driving torques in both propulsion drives cannot be reliably expected from the prime movers or their regulation, my invention provides for equipping both propulsion drives with respective equalizing transmissions whose respective free transmission members are individually connected either with the prime mover, or with the transmission shaft 8, or with each other in such a manner that the driving torques equalize each other through these two interconnected free transmission members.

In this case advantage is taken of the fact that the driving torque of the propeller screw changes with the second power of its speed of rotation. The cross connection, branched-off from the two distributor gearings of the individual propeller drives and extending between the two propeller drives, has the effect that the propeller screws always automatically adjust themselves during operation to such a speed of rotation that the required torque magnitudes are equal. The then resulting differences in speed of rotation are balanced against each other by rotation of the cross connection between the distributor gearings.

The steering of the ship, effected by simultaneous and uniform pivotal displacement of both propeller screws, then only requires introducing a displacing motion into the cross-connecting transmission between the two outrigger pipes 2, such steering displacement being effected either by direct actuation or with the aid of a rudder machine.

Figure 5:
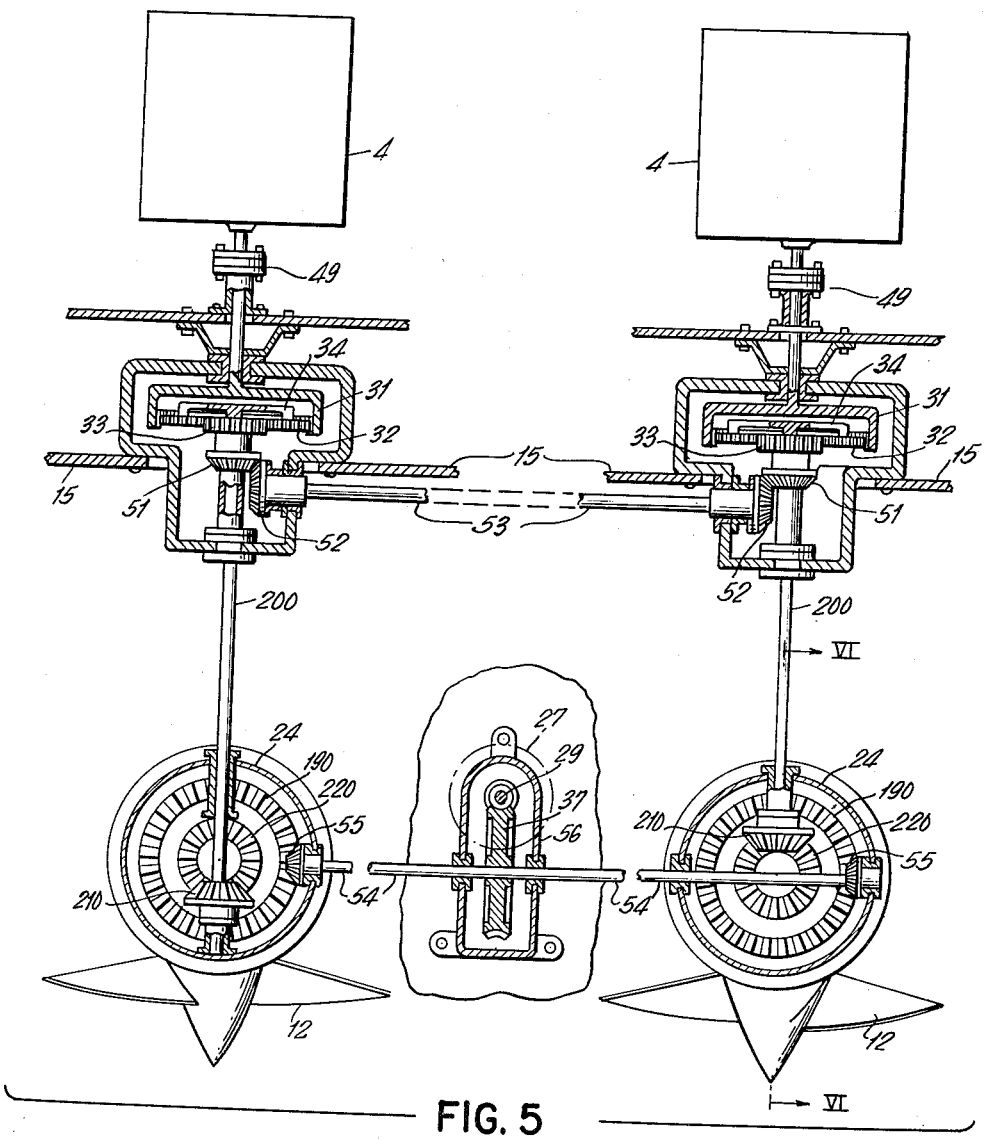
FIG. 5 shows a twin-propulsion plant having each of its two propulsion units equipped with a distributor transmission gearing and a propeller screw.

The embodiment of a twin propulsion drive shown in FIGS. 5 and 6 incorporates the above-mentioned features. Each of the two prime movers (not shown in FIGS. 5, 6) drives through a coupling flange 49 the orbit gear 31 of a planetary distributor gearing whose housing 50 is rigidly fixed to the body of the vessel. The planet gears 32 in each distributor gearing are in mesh with orbit gear 31 and with a sun gear 33. The planet or satellite gears are rotatably journalled on a bridge member 34 which is non-rotatably joined with the shaft 8 (FIG. 6) through a drive shaft 200 (FIG. 6) and a pair of bevel gears 210, 220. In each of the two distributor gearings, the sun gear 33 is rotatably journalled on the drive shafts 200, and both sun gears are mechanically interconnected by a transmission comprising two pairs of bevel gears 51, 52 and a cross connection 53. Similarly, the two outrigger pipes 2, each being journalled in a pivot bearing 25 of the housing 24 (FIG. 6), are each provided with a bevel gear 190 rigidly mounted on shaft 2, and mechanically connected with each other by a transmission comprising another cross connection 54 (FIG. 5) having respective bevel gears 55 meshing with the two bevel gears 190. This meshing is shown in FIG. 5 but is not indicated in FIG. 6 to avoid complicating the latter figure. Rigidly secured to the cross connection 54 and journalled within a housing 56 is a worm gear 37 meshing with a worm 29 which in turn is driven in one or the other direction from the steering means of the ship directly or with the aid of a rudder machine 27 to effect simultaneous pivotal movement of the two propulsion units as required for steering.

The performance of the twin drive is as follows. Assume that the prime movers driving the respective coupling flanges 49 have the same direction of rotation. The driving torque of each prime mover is divided by the appertaining distributor gearing into one torque component which is imparted to the propeller screw and another component which acts upon the cross connection 53 to counteract and balance the corresponding component torque of the other distributor gearing. The bevel gears 210 are fixed to the respective drive shafts 200 in such an arrangement that the two shafts 8 and hence the two propeller screws 12 have mutually opposed directions of rotation. In accordance with these driving conditions, two reactive or bracing torques of corresponding magnitudes and directions are transmitted from the two outrigger pipes 2 through the respective bevel gears 190 and 55 into the cross connection 54 so as to be balanced against each other. If by means of the worm 29 and the worm gear 37 the cross connection 54 is driven in either direction of rotation, the bevel-gear pairs 55/190 effect a pivotal displacement of the two propeller screws in the same sense.

The twin propulsion plant according to FIGS. 5 and 6 has the advantage that when one of the prime movers drops out, the other can be used to also drive, by power transmission through the equalizing cross connection 53, the otherwise inoperative second propeller screw at one-half of normal power. This results in the further advantage that even under such operating conditions, the reactive bracing torques of the two outrigger pipes 2 are of equal magnitude and are balanced against each other in the cross connection 54. Furthermore, during the operating condition last considered, the pivotal displacing movement required for steering the ship remains just as easily controllable by operation of the worm 29.

An outstanding advantage of propulsion plants with steerable propeller screws according to FIGS. 1 to 6 resides in the fact that the pivotal displacement of the propeller screw 12, obtainable over a practically unlimited angular range and without appreciable power requirements is also available for reversing the ship travelling direction without changing the direction of screw rotation. However, when passing from forward to reverse travel and vice versa, a temporary course variation of the ship may occur. In small propulsion plants, the pivoting of the screw for changing from forward to reverse travel can be performed so rapidly that such course variation remains slight or negligible. In larger plants where, in any event, a rudder machine is used, the reversal may in certain cases involve sufficient delay to cause an undesired amount of course variation. This, however, can be avoided by another feature of my invention embodied in the modification described presently.

In twin propulsion plants equipped with two individually complete propulsion units with pivotally mounted propeller screws operating in parallel to each other as described in the foregoing (FIGS. 5, 6), the provided two steering-control worms 29 can be actuated by a special transmission which permits the simultaneous rotation of the two worms 29 selectively either in the same sense of rotation or in mutually inverse relation.

In one case, the displacement of the two screws simultaneously and in the same sense changes the course of the vessel for steering. In the other case, that is when the two screws starting for instance from the normal straight forward travel position, are simultaneously turned about the pivot axis by the same amount but in opposite directions no change in course will take place because in all individual pivotal positions of the two screws the force components of the screws transverse to the longitudinal direction of the ship always cancel each other. However, during such simultaneous displacement by equal amounts and in opposite directions, the force components in the longitudinal direction remain effective.

FIGS. 7 and 8 are examples of embodiments of displacement control mechanisms suitable for the just-mentioned purpose.

In the displacing mechanism according to FIG. 7 the housing 58 of a bevel-gear equalizing transmission is rotatably journalled in bearing supports 57. The rudder control motor 27 is flange-connected with housing 58 and has its shaft provided with a bevel gear 59 simultaneously meshing with two bevel gears 60 and 60a. The bevel gears 60 and 60a are non-rotatably joined with coaxial displacement control shafts 61 and 61a respectively. The control shafts are revolvably journalled in housing 58 and are mechanically connected with the respective worms 29 (not shown in FIG. 7) of the two propulsion units of the twin plant. A worm gear housing 62 is mounted on the left-hand bearing support 57. A worm gear 63 in housing 62 meshes with a worm 64 which is likewise journalled in housing 62 and can be driven in either direction of rotation by a rudder drive 27a. Worm gear 63 is rigidly connected with the left-hand bearing of housing 58 so that by means of the rudder motor 27a the entire housing, including the rudder drive 27, can be turned relative to the bearing support 57 without limitation. When this is being done, the two bevel gears 60 and 60a are coupled with each other through the bevel gear 59 of the stationary rudder motor and therefore are turned simultaneously in the same direction of rotation. However, when the bevel gear 59 is being turned by the rudder motor 27, the two bevel gears 60 and 60a are turned simultaneously to the same extent but in mutually opposed directions. By selective actuation of motor 27 or motor 27a, the illustrated control mechanism can perform the desired type of displacement of the two propeller screws.

The displacement control mechanism in the embodiment of FIGURE 8 comprises a housing 65 in which the two displacement control shafts 61, 61a, leading to the displacement control worms of the two respective propulsion units, are journalled. The displacement control worms are not shown in FIG. 8, being similar in function to worm 29 of FIG. 5. Secured to each of the control shafts 61 and 61a are the respective bridge members 66 of a planetary gearing. The planet gears 320 of each gearing are rotatably mounted on bridge member 66 and are in meshing engagement with the orbit gear 67 or 67a and with the sun gear 68 or 68a. The orbit gears 67, 67a are rotatably mounted in housing 65 in coaxial relation to the sun gears 68, 68a and to the displacement control shafts 61, 61a. The orbit gears have each an exterior spur gear circle 69 meshing with a pinion 70.

The two pinions 70 are rigidly and coaxially connected with each other and with a worm gear 71 and are rotatably journalled in housing 65. Meshing with worm gear 71 is a worm 72 which can be driven in either direction of rotation by means of a rudder motor 27. The sun gears 68 and 68a are likewise rotatably mounted in housing 65 and are rigidly connected with bevel gears 60 and 60a simultaneously meshing with a bevel gear 59 likewise rotatably mounted in housing 65. Bevel gear 59 is rigidly joined with a worm 73 and, by means of worm 74 meshing with gear 73, can be driven in either direction of rotation by a rudder motor 27a.

Rotation of worm 72 by rudder motor 27 causes simultaneous rotation of orbit gears 67 and 67a by equal amounts. Since the sun gears 68 and 68a are kept stationary by the bevel gear 59, such rotation of orbit gears 67 and 67a results in simultaneous rotation in the same sense of the displacement control shaft 61 and 61a.

However, when worm 74 is driven by rudder motor 27a in either direction of rotation, then the bevel gear 59 causes the sun gears 68 and 68a to simultaneously rotate the same amount but in mutually opposed directions. Since now the orbit gears 67, 67a are kept arrested by the worm, this rotation is transmitted through the respective planet gears 320 and the bridge members to the respective control shafts 61, 61a. It is therefore possible to turn by means of rudder motor 27 the control shafts 61 and 61a in the same sense and by means of rudder motor 27a in the opposite sense relative to each other. The control shafts 61, 61a are each connected with the worm 29 of one of the two propulsion plants in any suitable manner, so that the displacement control mechanism according to FIG. 8 affords performing the selective, mutually opposed or equally directed pivoting movement of the two propeller screws.

Displacement control mechanisms according to FIGS. 7 and 8 also permit a temporary, simultaneous operation of both rudder motors and thus permit combining at will all practically occurring steering maneuvers. When the rudder motors 27 in the two parallel operation propulsion units are electric motors, then the same control displacement, that is simultaneous pivotal movements by the same amounts of the two respective propeller screws in the desired sense of rotation, can also be obtained, without the use of a displacement control mechanism according to FIGS. 7 and 8, by electrically interconnecting the two electric motors or their respective controls. This also permits the selective simultaneous or combined displacement of the two worms 29 and hence a corresponding pivotal displacement of the respective propeller screws 12 by the actuation of the proper electric switches.

The operating principle of the displacement control mechanisms according to FIGS. 7 and 8 can be incorporated in hydraulic (hydrostatic), pneumatic or steam-operated systems. Furthermore, the position of the pivot axis need not be vertical and, if desired for special purposes, the variation in the propulsion direction of the screws may be effected in any desired plane. The screw 12 may also consist of an air propeller or impeller if it is desired to turn the propeller shaft angularly about any desired pivot axis without appreciable application of power.

In cases where the reactive force or torque of the prime mover can readily be taken off from its housing, as is the case, for instance, with electric motors of small and medium power rating, a very simple connecting transmission between the propulsion screw or its gearing head and the housing of the prime mover can be employed. FIG. 9 shows an example of an embodiment incorporating such a simple connection.

According to FIG. 9, the housing 1 of the electric propulsion motor 4 is connected with the outrigger pipe 2 by a transmission comprising a tubular flexible shaft 17 and a pair of bevel gears 118, 119. The shaft 4a of the motor is rotatably mounted in housing 1, and the housing is rotatably journalled in coaxial relation to shaft 4a in stationary bearing supports 23, 23a. Housing 1 is firmly connected with the tubular flexible shaft 17 disposed in coaxial and telescopic relation to shaft 20. Shaft 17 drives a coaxial bevel gear 118 meshing with a bevel gear 119 on the outrigger tube 2. The bevel gears 118 and 121 are mounted in coaxial relation to each other, and the bevel gears 119 and 122 are likewise coaxial relative to each other. The bevel gears are located in a gear housing 240 which is fastened by screws to a bottom flange 15 secured to the ship deck 16. The housing 240 carries a tubular pivot bearing 25 coaxial to shaft 8 for guiding the rotatable outrigger tube 2. The flexible shafts 17 and 20 are non-rotatably joined with the respective appertaining shafts through so-called arcuate spur-gear couplings or in any other suitable manner. The hollow bearing shaft of housing 1 located on the side of the motor facing away from the flexible shafts, is provided with a worm gear 26 meshing with a worm 29. Gear 26 and worm 29 are rotatably mounted in a worm-gear housing 28 mounted on, or forming part of, the bearing support 23a. Worm 29 is driven in the desired direction of rotation from a rudder motor 27 of any suitable type or, if desired, directly from the steering wheel of the ship.

The bevel-gear pair 121/122, which also serves for reducing the revolving speed of the propeller screw, has a transmission ratio exactly corresponding to that of the bevel-gear pair 118/119. The housing 1 of the electric motor, the flexible transmission shaft 17, the bevel gears 118/119 and the outrigger pipe 2 with the propeller gear head 3 rotate only during, and in the sense of, a pivotal displacement of the propeller screw required for the steering of the vessel. The range of angular pivoting movement of the propeller screw in this embodiment is unlimited, provided the power supply means to the prime mover are correspondingly designed.

I claim:

1. A ship propulsion and steering plant, comprising a propeller shaft, a gear head in which said propeller shaft is journalled, said gear head being pivotally displaceable for changing the propulsion direction, a transmission shaft, gear means mounted in said gear head and connecting said transmission shaft with said propeller shaft, prime-mover means, a transmission between said prime-mover means and said transmission shaft, said transmission comprising a differential mechanism having two concentrically rotatable members drivingly connected with said transmission shaft and said gear head respectively, said prime mover being joined with said differential mechanism to impart relative rotation between said two members, and control means connected with said gear head to vary its rotary position.

2. A ship propulsion and steering plant, comprising a propeller shaft, a gear head in which said propeller shaft is journalled, said gear head being pivotally displaceable for changing the propulsion direction, a transmission shaft, gear means mounted in said gear head and connecting said transmission shaft with said propeller shaft, a drive shaft, a distributor transmission gearing having three coaxially rotatable gear members of which one is mechanically intermediate and geared to the two others for differential motion, one of said gear members being connected with said drive shaft to be driven therefrom, a second one of said gear members being drivingly connected with said transmission shaft for driving said propeller shaft, means connecting the third of said gear members with said gear head, and control means connected with said third member and with said gear head for varying their rotary positions respectively.

3. A ship propulsion and steering plant, comprising a propeller shaft, a gear head in which said propeller shaft is journalled, a hollow outrigger shaft firmly joined with said gear head and perpendicular to said propeller shaft, said hollow shaft being rotatable for pivotally displacing said gear head, a transmission shaft coaxially revolvable in said hollow shaft, gear means mounted in said gear head and connecting said transmission shaft with said propeller shaft, a drive shaft, a distributor transmission gearing having three coaxially rotatable gear members of which one is mechanically intermediate and geared to the two others for differential motion, one of said gear members being connected with said drive shaft to be driven therefrom, a second one of said gear members being drivingly connected with said transmission shaft for driving said propeller shaft, means connecting said third gear member with said hollow shaft, and control means drivingly connected with said gear head to impart pivotal displacement to said gear head.

4. A ship propulsion and steering plant, comprising a propeller shaft, a gear head in which said propeller shaft is journalled, a hollow outrigger shaft firmly joined with said gear head and perpendicular to said propeller shaft, said hollow shaft being rotatable for pivotally displacing said gear head, a transmission shaft coaxially revolvable in said hollow shaft, gear means mounted in said gear head and connecting said transmission shaft with said propeller shaft, a drive shaft, distributor transmission gear means comprising a planetary gearing having a stationary housing, said gearing having a sun-gear member and an orbit-gear member and a satellite member all in said housing, one of said two members being connected with said drive shaft to be driven thereby, a second one of said members being drivingly connected with said transmission shaft for driving said propeller shaft, and a control device drivingly connected with said third member for imparting pivotal displacement through said hollow shaft to said gear head.

5. A ship propulsion and steering plant, comprising a propeller shaft, a gear head in which said propeller shaft is journalled, said gear head being pivotally displaceable about an axis perpendicular to the propeller shaft axis for the purpose of steering the ship, a drive shaft, prime-mover means connected to said drive shaft and having a frame fixedly mounted to the hull of the ship, first transmission means connected between said drive shaft and said gear head, bevel gearing disposed within said gear head and connecting said propeller shaft with said prime-mover means, second transmission means, a steering displacement control device drivingly connected with said second transmission means for varying its rotary position, and an outrigger tube connecting said second transmission means with said gear head to impart pivotal displacement to said gear head, said first and second transmission means together being operably interconnected to each other and to said prime mover means to form torque-converting means for transmitting torque to the gear head independent of the pivotal displacement thereof in all operating conditions so that the torque of said second transmission means is of the same magnitude as the driving torque transmitted to said gear head from said drive shaft through said first transmission means, but acting in the opposite sense of rotation therefrom.

6. A ship propulsion and steering plant according to claim 5, said prime-mover means comprising a motor having a machine frame fixedly mounted to the hull of the ship and being provided with a propulsion machine having a machine housing rotatably mounted within said machine frame, said first transmission means comprising a first pair of meshing bevel gears drivingly connecting said machine housing with said gear head, said second transmission means comprising a second pair of meshing bevel gears coaxial with the respective gears of said first pair of bevel gears and drivingly connecting said steering displacement control device with said drive shaft, said machine housing being operably connected to said steering displacement control device for rotational motion within said frame in clockwise and counterclockwise directions and simultaneous with the rotational motion of said second pair of bevel gears and said gear head for steering the ship.

7. A ship propulsion and steering plant according to claim 5, comprising a transmission shaft, said bevel gearing in said gear head connecting said transmission shaft with said propeller shaft, said first and second transmission means together comprising two distributor transmission gearings each having three gear members coaxially rotatable relative to one another, two of said members being spur gears and the other member being intermediate said spur gear members and forming a differential gear train together therewith; two spur gear members of said respective two distributor gearings being joined with each other to rotate together, another one of said spur gear members being fixedly connected to the body of the ship, one of the remaining three members of said two gearings being connected with said drive shaft to be driven therefrom, another one of said remaining members being connected with said transmission shaft for driving said propeller shaft, the last remaining member being connected with said gear head, and a displacement control device drivingly connected with said last gear member for varying its rotary position to impart pivotal displacement to said gear head.

8. A ship propulsion and steering plant according to claim 5, comprising a transmission shaft, gear means mounted in said gear head and connecting said transmission shaft with said propeller shaft; said first transmission means comprising a first differential distributor transmission gearing having a housing member fixedly connected to the body of the ship, two gears and a differential member rotatable relative to said housing member and geared to said two gears, one of said two gears being connected with said drive shaft to be driven thereby, a control device drivingly connected with said other gear for rotating said other gear, said differential member being connected with said transmission shaft for driving said propeller shaft; said second transmission means comprising a second differential distributor transmission gearing coaxial to said first distributor gearing and comprising two gears and a rotatable differential member geared to said latter two gears, one of said latter two gears being stationary and the other being joined with said other gear of said first distributor gearing, and said differential member of said second distributor gearing being connected with said gear head for imparting pivotal movement thereto when said control device is in operation.

9. A ship propulsion and steering plant according to claim 5, comprising a hollow outrigger shaft firmly joined with said gear head and perpendicular to said propeller shaft, said hollow shaft being rotatable for pivotally displacing said gear head, a transmission shaft coaxially revolvable in said hollow shaft, said bevel gearing in said gear head connecting said transmission shaft with said propeller shaft; said first and second transmission means together comprising two planetary gearings each having three gear members coaxially rotatable relative to one another, two of said members being concentric spur gears in sun-and-orbit relation to each other, the third member having a planet gear in intermediate meshing engagement with said spur gear members; two spur gear members of said respective two planetary gearings being interconnected for joint rotation, another one of said spur gear members being stationarily mounted, one of the remaining three gear members being connected with said drive shaft to be driven therefrom, another one of said remaining members being connected with said transmission shaft for driving said propeller shaft, the last member being connected with said gear head, and a displacement control device drivingly connected with said last gear member for varying its rotary position to impart pivotal displacement to said gear head.

10. A ship propulsion and steering plant according to claim 5, comprising a hollow outrigger shaft firmly joined with said gear head and perpendicular to said propeller shaft, said hollow shaft being rotatable for pivotally displacing said gear head, a transmission shaft coaxially revolvable in said hollow shaft, said bevel gearing in said gear head connecting said transmission shaft with said propeller shaft; said first transmission means comprising a first planetary gearing comprising a sun gear, an orbit gear and a rotatable intermediate member geared to said two gears, said orbit gear being connected with said drive shaft to be driven thereby; a control device drivingly connected with said sun gear for rotating said sun gear, said intermediate member being connected with said transmission shaft for driving said propeller shaft; said second transmission means comprising a second planetary gearing coaxial to said first gearing and comprising another sun gear, another orbit gear and another rotatable intermediate member geared to said latter two gears, said other orbit gear being stationary, said other sun gear being joined with said sun gear of said first gearing to rotate together therewith, and said other intermediate member being connected with said gear head for imparting pivotal movement thereto when said control device is in operation.

11. A ship propulsion and steering plant according to claim 7, said prime mover means comprising a propulsion motor joined with said drive shaft, said motor and said two distributor gearings being coaxially aligned with said hollow shaft and forming together a single propulsion assembly, said two distributor gearings being located adjacent to each other between said motor and said hollow shaft.

12. In a ship propulsion and steering plant according to claim 7, said gear head with said propeller shaft and said transmission shaft forming a single propulsion assembly together with said distributor gearings and said control device, said prime mover means comprising a propulsion motor horizontally spaced from said assembly for separate mounting, and shaft means connecting said motor with said drive shaft, said gear head being mounted so as to have a pivotal displacement range of at least 180° in both directions from normal position.

13. In a plant according to claim 12, said shaft means having an axis transverse to that of said hollow shaft, and said two distributor gearings being mounted above said axis of said shaft means in coaxial relation to said hollow shaft.

14. In a plant according to claim 9, said two planetary gearings being mounted one above the other in coaxial relation to said hollow shaft and said transmission shaft to form a single propulsion assembly together therewith, said drive shaft being geared to the orbit gear member of the lower planetary gearing, said interconnected and jointly rotatable spur gear members being constituted by the sun gears of said respective planetary gearings, said stationary spur gear member forming the orbit of the upper gearing, the intermediate member of the upper gearing being connected with said transmission shaft, and the intermediate member of the lower gearing being connected with said gear head and in driven connection with said control device.

15. A ship propulsion and steering plant according to claim 5, comprising a transmission shaft, said prime mover means including a propulsion motor spaced from said transmission shaft in substantially horizontal direction, said distributor transmission gearing being mounted on said motor and first and second transmission means extending between said distributor gearing and said transmission shaft and together comprising two angle-gear devices of which one is disposed between said second gear member and said transmission shaft, said other angle-gear device being disposed between said third gear member and said gear head.

16. A ship propulsion and steering plant according to claim 9, comprising a transmission shaft, said prime mover means including a propulsion motor spaced from said transmission shaft in substantially horizontal direction, said two planetary gearings being coaxially mounted on said motor, said drive shaft connecting said motor with the sun gear of one of said gearings whereas the other sun gear forms said stationarily mounted member, the two interconnected and jointly rotatable members consisting of the two orbit gears and being in driven connection with said control device, two transmission means connecting said planetary gearings with said transmission shaft and gear head, one of said transmission means having a pair of bevel gears of which one is coaxially mounted on said transmission shaft, said other transmission means having another pair of bevel gears of which one is coaxially joined with said gear head.

17. A ship propulsion and steering plant according to claim 5, comprising a transmission shaft, said prime mover means including a propulsion motor spaced from said transmission shaft and hollow shaft in a substantially horizontal direction, said second transmission means including planetary gearing having a sun gear, an annular orbit gear and a satellite member, mounted on said motor and having said sun gear connected to said motor through said drive shaft, said control device being connected with said orbit gear, said first transmission means including a first pair of bevel gears having one bevel gear coaxially mounted on said hollow shaft and the other connected with said orbit gear, a second pair of bevel gears having one bevel gear coaxially connected with said transmission shaft and the other with said satellite member, the transmission ratios of said respective first and second pairs being inversely proportional to the corresponding transmission ratios of said second transmission means, whereby the respective torques transmitted to said hollow shaft and said transmission shaft are equal in magnitude.

18. A twin propulsion system according to claim 5, comprising two individual propulsion units in parallel relation, each unit having a respective propeller shaft, a respective gear head in which the respective propeller shaft is journalled, a respective drive shaft, a respective propulsion prime mover connected with the respective drive shaft and having a respective electric motor forming part of said control device, and control means interconnecting said two motors and comprising selective switch means for displacing the two gear heads simultaneously and individually in the same and in mutually opposed directions respectively.

19. A twin propulsion system according to claim 5, comprising two individual propulsion units in parallel relation, each unit having a respective propeller shaft, a respective gear head in which the respective propeller shaft is journalled, a respective drive shaft, a respective propulsion prime mover connected with the respective drive shaft, and a differential control mechanism common to said two units and having two coaxial output gears and an intermediate member geared to both said output gears, said two output gears being drivingly connected with said respective control devices of said two units, a first rudder motor drivingly connected with both said output gears for rotating them in the same direction, a second rudder motor drivingly connected with said intermediate member for rotating said output gears in mutually opposed directions, said two rudder motors being operable independently of each other.

20. A twin propulsion system comprising two individual plants according to claim 2 in parallel relation, each plant having a propulsion prime mover connected with respective drive shafts; a control mechanism common to said two plants and comprising two coaxially mounted differential gear assemblies each having three coaxially rotatable parts of which one forms a differential bridge member between the two others, the two bridge members of said respective gear assemblies being drivingly connected with said respective control devices of said two plants, a first rudder motor in driving connection with a first one of said other parts of each gear assembly one for selectively rotating said first parts of both assemblies together in the said selected direction, a second rudder motor in driving connection with the second part of each of said two gear assemblies for rotating said latter part selected but in mutually opposed directions.

21. A twin propulsion system comprising two individual plants according to claim 2 in parallel relation, each plant having a propulsion prime mover connected with respective said drive shafts; said control means of said two plants comprising a cross-connecting transmission connecting said respective third gear members of said two plants with each other, and said control means further comprising a cross-connecting transmission interconnecting said respective gear heads of said two plants, whereby the torques of said respective third members balance each other and the reactive torques of said gear heads also balance each other under all operating conditions.

22. In a plant according to claim 5, at least one of said first and second transmission means forming part of a step-down gear train between said drive shaft and said propeller shaft for operating said propeller shaft at reduced speed relative to said drive shaft.

23. In a plant according to claim 5, said control device comprising a worm gear drivingly connected with said gear head, and a worm meshing with said worm gear and adopted for operation by ship steering control means.

References Cited in the file of this patent

UNITED STATES PATENTS

| 2,228,638 | Mercier | Jan. 14, 1941 |
| 2,372,247 | Billing | Mar. 27, 1945 |
| 2,755,765 | Wanzer | July 24, 1956 |

FOREIGN PATENTS

| 550,221 | Germany | May 6, 1932 |